Oct. 19, 1965    G. A. WALKER ETAL    3,212,610
DUAL PAWL DOG CLUTCH
Filed Sept. 27, 1963    3 Sheets-Sheet 1

INVENTORS.
GEORGE A. WALKER
RICHARD E. HOSEY

BY Frank C. Leach jr.

ATTORNEY.

United States Patent Office 3,212,610
Patented Oct. 19, 1965

3,212,610
DUAL PAWL DOG CLUTCH
George A. Walker and Richard E. Hosey, Lexington, Ky., assignors to International Business Machines Corporation, New York, N.Y., a corporation of New York
Filed Sept. 27, 1963, Ser. No. 312,135
20 Claims. (Cl. 192—33)

This invention relates to power transmitting mechanisms and, more particularly, to a mechanical dog-type clutch.

The direct and positive action of a conventional dog-type clutch creates several problems. One of these is that a high shock loading occurs when the driving member begins to drive the driven member. Another problem of conventional dog clutches is that the drive pawl, which engages the driving member to transmit power to the driven member, sometimes fails to completely engage the tooth of the driving member whereby there is premature wear of the pawl due to nipping. Both of these problems reduce the life expectancy of a dog clutch.

The present invention satisfactorily solves both of these problems to produce a dog-type clutch with increased life expectancy. The present invention eliminates high shock loading through the use of a resilient coupling or connection between a carrier of the drive pawl and the driven member. This invention also eliminates premature wear of the drive pawl by insuring that there is positive engagement between the drive pawl and the driving member before driving of the pawl begins.

In a clutch such as a mechanical dog-type clutch, the driven member may be a cam shaft subjected to a varying load. If the load decreases substantially in a minute amount of time, the driven member tends to overrun the driving member. The present invention satisfactorily solves this problem by providing a dual pawl structure with one of the dual pawls functioning to prevent overrunning of the clutch.

By eliminating the foregoing problems, the present invention may be utilized to provide a predetermined amount of drive to the driven member during each engagement of the clutch. By insuring that there is positive engagement between the drive pawl and the driving member before drive begins, there is no opportunity for slippage so that the driven member is moved the predetermined amount during each cycle. Furthermore, the prevention of overrunning of the clutch by the driven member insures that the driven member is driven at a constant speed when the clutch is engaged.

Accordingly, an object of this invention is to provide a mechanical dog-type clutch having means to insure positive engagement of the drive pawl with the driving member.

Another object of this invention is to provide a non-overrunning mechanical dog-type clutch.

A further object of this invention is to provide a clutch that reduces shock loading when the driving member begins to drive the driven member.

The foregoing and other objects, features, and advantages of the invention will be apparent from the following more particular description of a preferred embodiment of the invention, as illustrated in the accompanying drawings.

Figure 1:
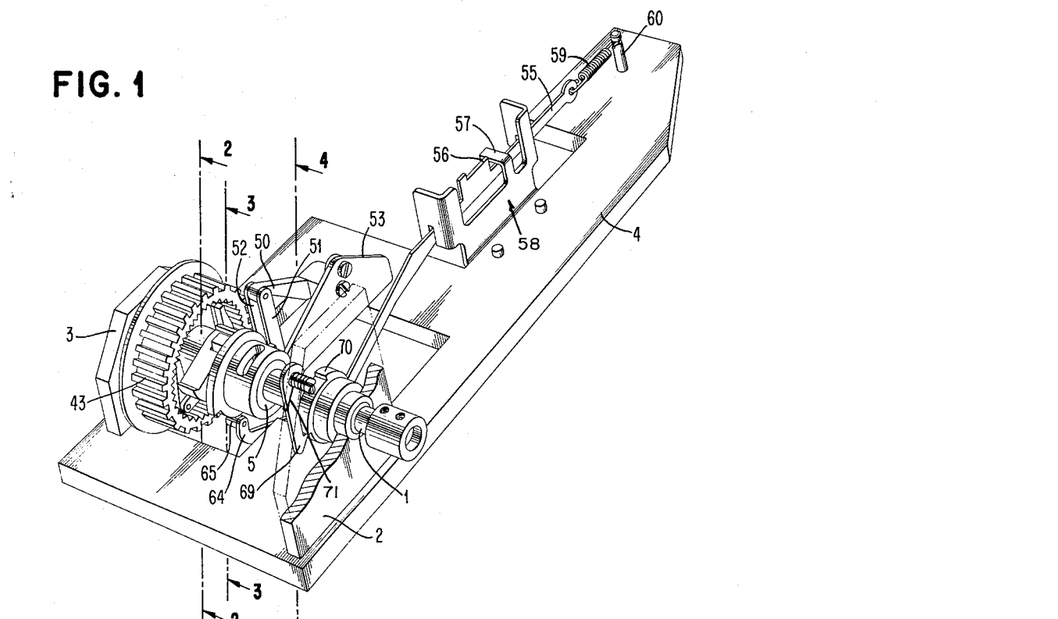
FIG. 1 is a perspective view of the clutch of the present invention.

Referring to the drawings and particularly FIG. 1, there is shown a shaft 1 journaled by suitable bearings in support members 2 and 3, which extend upwardly from a base 4. The shaft 1, which is driven when the clutch is engaged, is connected to a load, which may vary, through a connecting shaft or its own extension (not shown), for example.

Figures 4, 5:
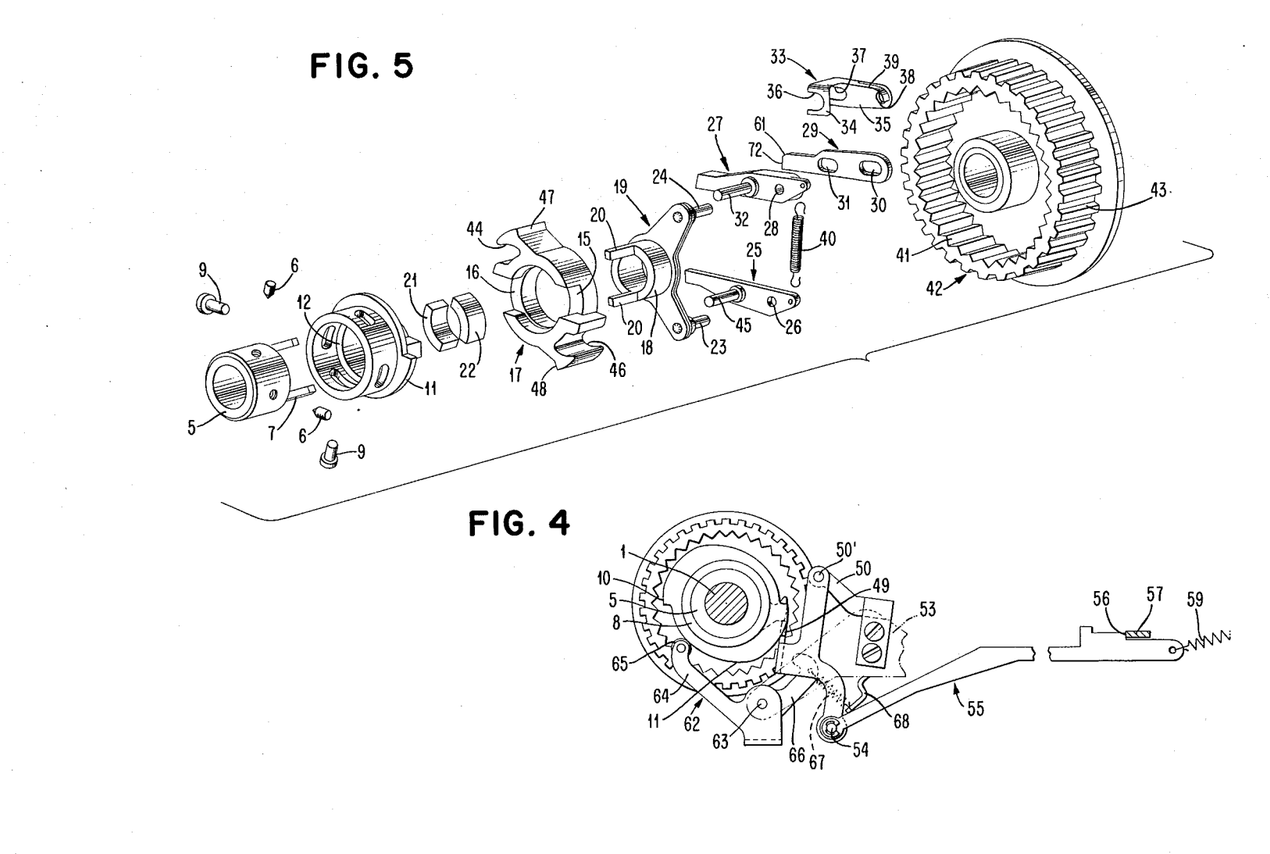
FIG. 4 is a sectional view taken along the line 4—4 of FIG. 1 and illustrating a portion of the latching mechanism.
FIG. 5 is an exploded view of various portions of the clutch structure but not showing the driven shaft or the latching mechanism.

A hub 5 is secured to the shaft 1 by a plurality of set screws 6 (see FIG. 5). The hub has a pair of diametrically opposed fingers 7 extending therefrom.

An annular member 8 surrounds the hub 5 and is attached thereto by screws 9. The annular member 8 has a pair of diametrically opposed cams 10 and 11 on its outer periphery (see FIG. 4). It should be noted that the bore of the annular member 8 is stepped down to a smaller diameter with a shoulder 12 (see FIG. 5) therebetween. The fingers 7 of the hub 5 are mounted inboard of the outer diameter of the hub 5 for disposition within the smaller bore of the annular member 8. The end of the hub 5 abuts against the shoulder 12 to provide a fixed relationship therebetween.

The annular member 8 also has a pair of diametrically opposed stops 13 and 14 (see FIG. 3) extending therefrom. The stops 13 and 14 are adapted to be disposed in grooves 15 and 16, respectively, of a throwout ring 17. As clearly shown in FIG. 3, the grooves 15 and 16 are larger than the stops 13 and 14 to permit relative movement therebetween.

The throwout ring 17 is supported on an annular shoulder 18 of a pawl carrier 19, which is in free pivot on the shaft 1. The pawl carrier 19 has a pair of diametrically opposed fingers 20 extending therefrom on the same diameter as the fingers 7 of the hub 5.

A pair of rubber arcuate segments 21 and 22 is disposed between the fingers 20 of the pawl carrier 19 and the fingers 7 of the hub 5. When the pawl carrier 19 rotates, one of its fingers 20 drives one of the fingers 7 of the hub 5 through the rubber segment 21 while the other of the fingers 20 transmits its power through the other rubber segment 22 to the other of the fingers 7 of the hub 5. Thus, a resilient connection is provided between the pawl carrier 19 and the shaft 1 to prevent high shock loading when the clutch is engaged.

If desired, the rubber segments 21 and 22 could be omitted by forming the fingers 7 of a resilient or flexible material such as plastic and enlarging their size to that of a finger and a rubber segment. In either construction, the resilient material compresses when the shaft 1 is initially starting and then expands as the shaft 1 picks up speed.

The pawl carrier 19 has a pair of pivot pins 23 and 24 projecting therefrom on the opposite side from the annular shoulder 18. A check pawl 25 has an aperture or opening 26 for mounting the check pawl 25 on the pivot pin 23. A drive pawl 27 has an aperture or opening 28 therein to mount the drive pawl 27 on the pivot pin 24. A phasing pawl 29, which is contiguous to the drive pawl 27, also has an aperture or opening 30 to mount the phasing pawl 29 on the pivot pin 24. The aperture 30 is substantially larger than the pivot pin 24 and the aperture 28 of the driving pawl 27 to allow movement of the phasing pawl 29 relative to the drive pawl 27.

The phasing pawl 29 has a second aperture or slot 31 for cooperation with a pin or stud 32, which projects from both sides of the drive pawl 27. The slot 31 is substantially larger than the pin 32. A side 34 of a spring member 33 is positioned on the side of the drive pawl 27 remote from the phasing pawl 29 while a side 35 is positioned on the side of the phasing pawl 29 remote from the drive pawl 27. The sides 34 and 35 of the spring member 33 have grooves or slots 36 and 37 in one end for reception of the pin 32.

Figure 2:
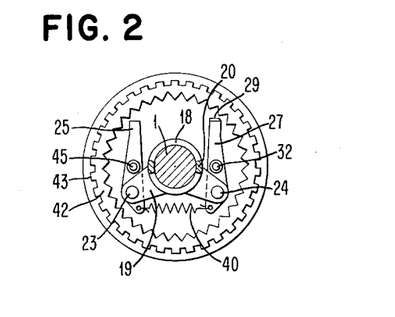
FIG. 2 is a sectional view taken along the line 2—2 of FIG. 1.

The spring member 33 also has an aperture 38 for mounting the spring member 33 on the pivot pin 24 of the pawl carrier 19. The spring member 33 has a resilient member 39 acting against the end of the phasing pawl 29 to move the phasing pawl 29 relative to the drive pawl 27. This occurs because of the enlarged sizes of the apertures 30 and 31 of the phasing pawl 29 with respect to the pivot pin 24 and the pin 32, respectively. Thus, the end of the phasing pawl 29 tends to extend outwardly beyond the end of the drive pawl 27 whenever the pawls 27 and 29 are not engaged (see FIGS. 2 and 3).

It should be understood that the drive pawl 27, the phasing pawl 29, and the spring member 33 are retained on the pivot pin 24 by a spring clip (not shown), which fits within a radial groove (not shown) adjacent the end of the pin 24. Similarly, the phasing pawl 29 and the spring member 33 are held on the pin 32 by a spring clip (not shown), which fits in a radial groove adjacent the end of the pin 32. The check pawl 25 is secured on the pivot pin 23 by a spring clip (not shown), which is disposed in a radial groove (not shown) adjacent the end of the pin 23.

The check pawl 25 and the drive pawl 27 are connected by resilient means such as a spring 40 secured to their lower ends. The spring 40 urges the check pawl 25 and the drive pawl 27 to pivot about the pins 23 and 24, respectively, on the pawl carrier 19. Of course, since the pin 32 is secured to the drive pawl 27 and passes through the aperture 31 in the phasing pawl 29, the spring 40 indirectly urges the phasing pawl 29 to pivot about the pin 24.

Figure 6:
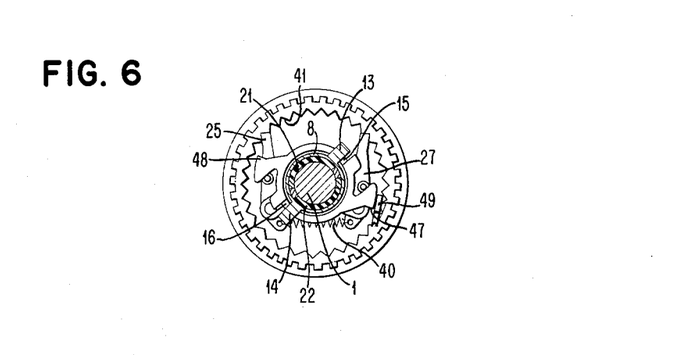
FIG. 6 is a sectional view similar to FIG. 3 but with the pawls engaged with the driving member.

The pawls 25, 27, and 29 are adapted to cooperate with teeth 41 on the inner periphery of a pulley driver 42, which functions as the driving member and may be driven by any suitable means. One means of driving the pulley driver 42 is to provide teeth 43 on the outer periphery of the pulley driver 42 for engagement with serrations on a belt (not shown), which may be driven by suitable motive means such as an electric motor (not shown), for example. Thus, whenever one of the inner teeth 41 of the pulley driver 42 is engaged by the drive pawl 27 (see FIG. 6), drive is transmitted to the shaft 1 through the pawl carrier 19, the fingers 20, the rubber segments 21 and 22, the fingers 7, and the hub 5.

The pin 32 of the drive pawl 27 is positioned in a groove 44 of the throwout ring 17. A similar projecting pin or stud 45 extends from one side of the check pawl 25 for disposition within a groove 46 of the throwout ring 17. Each of the grooves 44 and 46 has a camming surface for cooperation with the pins 32 and 45 to rotate the pawls 25, 27, and 29 about the pins 23 and 24 to overcome the force of the spring 40 whereby the pawls are removed and held from engagement with the teeth 41 on the inner periphery of the pulley driver 42.

The throwout ring 17 has diametrically opposed latching surfaces 47 and 48 adjacent the grooves 44 and 46, respectively, for cooperation with a latch 49 of a triggering and latching mechanism. When one of the latching surfaces 47 or 48 abuts against the latch 49 during rotation of the throwout ring 17, further rotation of the ring 17 is prevented. This results in the pins 32 and 45 riding in the camming surfaces in the grooves 44 and 46, respectively, to overcome the force of the spring 40.

The latch 49 is preferably formed integral with a pair of spaced arms 51 and 52, which are pivotally connected to a plastic member 50 by a pivot pin 50'. The plastic member 50 is secured to the base 4 through an upstanding member 53. When the latch 49 engages one of the latching surfaces 47 and 48 of the throwout ring 17, the plastic member 50 has sufficient resiliency to absorb a portion of the energy transmitted through the latch 49.

The arm 51 has a lower portion extending downward further than the arm 52. The lower portion of the arm 51 is secured through a pin 54 to a link 55 of the triggering or actuating mechanism. The link 55 has a shoulder 56 thereon for cooperation with a stop 57 on a bracket 58, which is secured to the base 4. The link 55 is urged to the right (as viewed in FIG. 4) by a spring 59, which is connected at one end to the link 55 and at its other end to a post 60 on the base 4. Accordingly, when the link 55 is in the position of FIG. 4 wherein the shoulder 56 abuts against the stop 57 of the bracket 58, the latch 49 is positioned to engage one of the latching surfaces 47 and 48 of the throwout ring 17. However, when the link 55 is moved downwardly by suitable means (not shown) so that the shoulder 56 clears the stop 57, the spring 59 retracts the link 55 to the right (as viewed in FIG. 4) to move the latch 49 away from engagement with the latching surface 47 and 48 of the throwout ring 17 due to pivoting of the latch 49 about the pivot pin 50'.

As soon as the latch 49 ceases engagement with the latching surface 47 or 48 of the throwout ring 17, the spring 40 urges the check pawl 25 to move about the pivot pin 23 and the drive pawl 27 and the phasing pawl 29 to move about the pivot pin 24. This moves the pawls toward the teeth 41 of the pulley driver 42. However, the resilient member 39 of the spring member 33 maintains the end of the phasing pawl 29 beyond the end of the drive pawl 27 so that the phasing pawl 29 first contacts one of the teeth 41 prior to engagement by the drive pawl 27 or the check pawl 25.

The leading edge of the phasing pawl 29 has a tip 72 and a cam surface 61, which is preferably formed at an angle of 30°, for cooperation with the teeth 41 of the pulley driver 42. The teeth 41 are formed so that the tip 72 of the phasing pawl 29 must engage a specific portion thereof or the cam surface 61 of the phasing pawl 29 will force the phasing pawl 29 to be cammed to the next of the teeth 41. If the tip 72 of the phasing pawl 29 engages the specific portion of one of the teeth 41, then the phasing pawl 29 will remain in contact with that tooth and the drive pawl 27 then moves outwardly into engagement with the same tooth. However, if the tip 72 of the phasing pawl 29 engages an area of one of the teeth 41 in which there would not be sufficient engagement between the drive pawl 27 and the tooth to prevent slippage, the cam surface 61 will cause the phasing pawl 29 and, of course, the drive pawl 27 to move to the next of the teeth 41 whereby there will be positive engagement. Thus, the cam surface 61 insures that there is positive engagement between the drive pawl 27 and one of the teeth 41 of the driving member 42.

After the drive pawl 27 engages one of the teeth 41, the check pawl 25 moves into engagement with another of the teeth 41. However, the check pawl 25 does not contact one of the teeth 41 until the drive pawl 27 is in engagement with one of the teeth 41.

In order that the shaft 1 may be rotated only 180° in response to actuation of the link 55, the latching surfaces 47 and 48 are diametrically opposed to each other. Actuation of the link 55 removes the latch 49 from engagement with the latching surfaces 47 or 48. In order that the latch 49 will engage the next latching surface 47 or 48 during rotation of the throwout ring 17 to insure that the shaft 1 rotates only 180°, the latch 49 must be returned to its latching or engaging position prior to the rotation of the next of the latching surfaces 47 or 48 to the engaging position of the latch 49.

Accordingly, a bell crank lever 62 is pivotally mounted to the upstanding member 53 through a pin 63. An arm 64 of the bell crank lever 62 has a roller 65 for cooperation with the cams 10 and 11 of the annular member 8. The bell crank lever 62 has its other arm 66 adapted to engage the lower end of the latch 49 when the bell crank lever 62 is pivoted counter-clockwise about the pin 63 by the roller 65 moving along the cam 10 or 11.

The bell crank lever 62 is urged clockwise about the pin 63 by a spring 67. One end of the spring 67 is attached to the arm 66 while the other end is attached to a projection 68 of the upstanding member 53.

As the shaft 1 is driven by the driving member 42, the annular member 8 along with its cams 10 and 11 also rotates to cause the bell crank lever 62 to pivot counter-clockwise about the pin 63 through movement of the roller 65. This moves the arm 66 into engagement with the lower end of the latch 49 to return the latch 49 to a position where it will engage the latching surface 47 or 48 of the throwout ring 17.

The cams 10 and 11 are designed so that the latch 49 is returned to its engaging position prior to the arrival of the latching surface 47 or 48. In fact, the cams 10 and 11 actually slightly overthrow the latch 49 beyond its latching position when the roller 65 is contacting the high dwell of the cam 10 or 11. Before the roller 65 drops off the cam 10 or 11 so as to be spaced from the latch 49 to allow movement of the latch 49 when the link 55 is actuated, the cams 10 and 11 are designed to return the latch 49 from its overthrow position to its latching position by having a slightly reduced profile between high dwell and the end of the cam.

Furthermore, the return of the latch 49 to its latching position results in the link 55 being moved so that its shoulder 56 is again in engagement with the stop 57 of the bracket 58. Accordingly, the link 55 is again ready for actuation after the driving member 42 is disconnected from the shaft 1.

Figure 3:
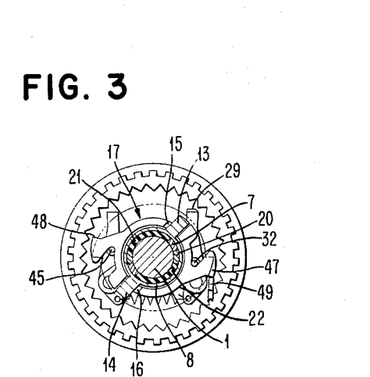
FIG. 3 is a sectional view taken along the line 3—3 of FIG. 1 and showing the pawls disengaged from the driving member.

Considering the operation of the present invention, it will be assumed that the latch 49 is engaging the latching surface 47 of the throwout ring 17 as shown in FIG. 3. When the link 55 is tripped by suitable means (not shown) urging it downward, the shoulder 56 moves below the stop 57 of the bracket 58. This allows the spring 59 to exert a force on the link 55 and rotate the latch 49 counter-clockwise about the pivot pin 50'.

As soon as the latch 49 moves from contact with the latching surface 47, the spring 40 causes the pawls 25, 27, and 29 to pivot about the pins 23 and 24 of the pawl carrier 19. This results in a slight clockwise rotation of the throwout ring 17 due to the outward movement of the pins 32 and 45 in the camming surfaces of the grooves 44 and 46. This slight movement of the ring 17 moves the forward walls of the grooves 15 and 16 from contact with the stops 13 and 14 and the rear walls of the grooves 15 and 16 into engagement with the stops 13 and 14. This slight movement of the ring 17 is compensated when the ring 17 is stopped after completing its half cycle of revolution prior to the shaft 1 ceasing to rotate by the stops 13 and 14 moving to engage the forward walls of the grooves 15 and 16.

The phasing pawl 29 first engages one of the teeth 41 because the force of the resilient member 39 of the spring member 33 maintains the end of the phasing pawl 29 slightly beyond the end of the drive pawl 27 when the pawls are not engaging the teeth 41.

The tip 72 of the phasing pawl 29 must engage a certain area of one of the teeth 41 in order for the drive pawl 27 to be allowed to enter the same tooth for engagement therewith. If the tip 72 of the phasing pawl 29 does not engage the area that insures positive engagement of the drive pawl 27 with the tooth, the camming surface 61 moves the phasing pawl 29 and the drive pawl 27 to the next of the teeth 41 where there will be positive engagement between the drive pawl 27 and the driving member 42. This positive engagement is insured when the camming surface 61 causes the pawl 29 to move to the next of the teeth 41 because of the design of the teeth 41.

With the drive pawl 27 engaging one of the teeth 41, the check pawl 25 moves into contact with another of the teeth 41 to prevent overrun. If the speed of rotation of the shaft 1 tends to exceed the speed of the drive member 42, the check pawl 25 exerts a force to prevent the shaft 1 from increasing its speed beyond the speed of the drive member 42. It should be understood that the geometry of the teeth 41 prevents the check pawl 25 from entering one of them until the drive pawl 27 is in the process of being seated in another of the teeth 41.

The engagement of the drive pawl 27 with one of the teeth 41 allows power to be transmitted from the drive member 42 to rotate the pawl carrier 19, which becomes a driven member. The pawl carrier 19 rotates the shaft 1 through cooperation of the fingers 20 on the pawl 19, the rubber segments 21 and 22, the fingers 7 of the hub 5, and the hub 5.

Since the annular member 8 is attached to the hub 5, it rotates with the shaft 1. Rotation of the annular member 8 causes the cam 11 to urge the roller 65 away from the annular member 8 to rotate the bell crank lever 62 counter-clockwise about the pin 63. As the shaft 1 is rotated by the pulley driver 42, the roller 65 continues to follow the increasing profile of the cam 11 to urge the arm 66 of the bell crank lever 62 into engagement with the lower end of the latch 49. This counter-clockwise rotation of the bell crank lever 62 overcomes the force of the spring 67, which urges the bell crank lever 62 to rotate clockwise about the pin 63.

When the annular member 8 has advanced to a position wherein the highest dwell of the cam surface 11 is engaging the roller 65, the arm 66 of the bell crank lever 62 will have moved the latch 49 to an overthrow position beyond its latchings position where it can engage the latching surface 48 of the throwout ring 17. Since the throwout ring 17 has the pins 32 and 45 engaging in the grooves 44 and 46, respectively, the throwout ring 17 rotates when the drive pawl 27 is engaged with one of the teeth 41.

As the latch 49 is moved by the bell crank lever 62, the arms 50 and 51 move clockwise about the pivot pin 50'. Clockwise rotation of the arm 51 about the pivot pin 50' urges the link 55 rearward (to the left as viewed in FIG. 4) to dispose the shoulder 56 again behind the stop 57 of the bracket 58.

After the roller 65 passes the high dwell on the cam 11, the spring 67 pivots the bell crank lever 62 clockwise about the pin 63 to return the latch 49 to its latching position. When the roller 65 drops off the cam 11, the spring 67 pulls the arms 66 away from contact with the lower end of the latch 49. As a result, the spring 59 holds the shoulder 56 of the link 55 in engagement with the stop 57 of the bracket 58 to maintain the latch 49 in its latching position.

When the latching surfaces 48 abuts against the latch 49, further movement of the throwout ring 17 is prevented. With the throwout ring 17 locked against rotation, the pins 32 and 45 ride down the camming surfaces of the grooves 44 and 46, respectively. The camming surfaces of the grooves 44 and 46 are designed to urge the pins 32 and 45 toward each other against the force of the spring 40 whereby the pawls 25, 27, and 29 are removed from engagement with the teeth 41 of the driving member 42 by pivoting about the pins 23 and 24. It should be observed that the camming surfaces of the grooves 44 and 46 are designed so that the spring 40 cannot return the pawls 25, 27, and 29 into engagement with the teeth 41 of the driving member 42 until the latch 49 is again triggered or actuated.

Prior to the pins 32 and 45 moving down the camming surfaces of the grooves 44 and 46, respectively, of the throwout ring 17, there is a slight additional rotation of the pawl carrier 19 and the shaft 1. This slight additional rotation of the pawl carrier 19 and the shaft 1 is limited by the stops 13 and 14 on the annular member 8 contacting forward walls of the grooves 15 and 16, respectively, of the throwout ring 17, which is held against rotation by the latch 49.

In order to insure that there is no reverse rotation after the stops 13 and 14 have abutted against the walls of the grooves 15 and 16, a keeper 69 is secured to the support member 2 for cooperation with a detent wheel 70. The detent wheel 70 is mounted for rotation with the shaft 1. Stops on the detent wheel 70 allow the shaft 1 to rotate clockwise when the pulley driver 42 is driving it, but prevent counter-clockwise rotation.

A spring 71 urges the keeper 69 into engagement with the stops on the detent wheel 70. Two diametrically opposed stops of the four stops on the keeper 70 function to prevent reverse rotation of the shaft 1 after overthrow of the shaft 1 while the other two diametrically disposed stops prevent reverse rotation of the shaft 1 to prevent oscillation of the clutch after the roller 65 reaches the high dwell of the cam 10 or 11.

Figure 7A:
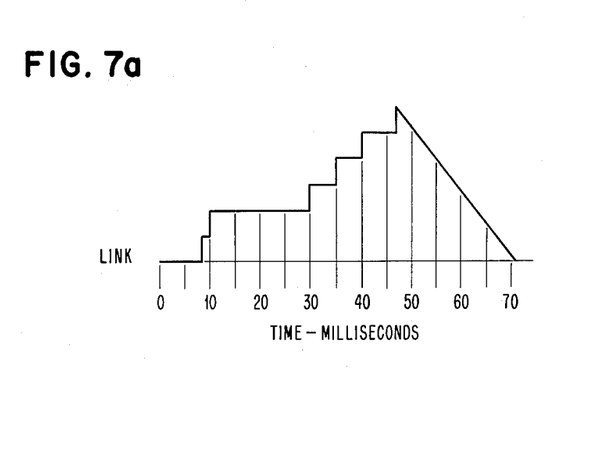
FIGS. 7a and 7b are schematic representations of the timing of the actuating mechanism for the clutch and the driven shaft, respectively.
Figure 7B:
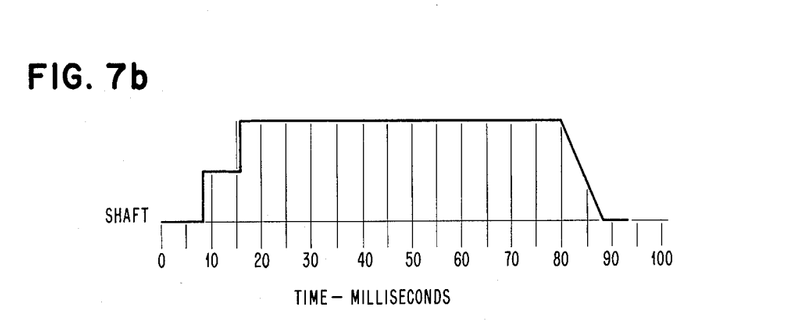

The relationship of the link 55 and the shaft 1 is illustrated in FIGS. 7a and 7b, respectively, with the ordinates representing time and the abcissas indicating when a change occurs in the position of the link in FIG. 7a and the position of the shaft in FIG. 7b. Referring to FIGS. 7a and 7b, it will be assumed that the link 55 is tripped or triggered at zero by releasing the shoulder 56 from engagement with the stop 57 of the bracket 58.

At approximately 8 milliseconds, the latch 49 is actuated by the spring 59 pulling the link 55 to the right as viewed in FIG. 4 whereby the latch 49 is removed from engagement with the latching surface 47 or 48 of the throwout ring 17. The release of the latch 49 at 8 milliseconds also is illustrated in FIG. 7b. The link 55 ceases its forward (to the right as viewed in FIG. 4) motion at 10 milliseconds as indicated in FIG. 7a.

The shaft 1 starts to rotate at 16 milliseconds as shown in FIG. 7b. This occurs when the drive pawl 27 is engaged with one of the teeth 41 of the drive member 42. However, it is assumed that the cam surface 61 of the phasing pawl 29 moved the phasing pawl 29 to the next adjacent of the teeth 41. If contact were made with the first tooth, the shaft 1 would start to rotate at 12 milliseconds. The shaft 1 is rotated through 180° because the latching surfaces 47 and 48 are diametrically disposed on the throwout ring 17. This rotation appears in FIG. 7b from 16 milliseconds to 80 milliseconds.

During rotation of the shaft 1, the start of restore motion of the latch 49 and the link 55 is shown in FIG. 7a at 30 milliseconds, this occurs when the cam 11 of the annular member 8 starts to actuate the bell crank lever 62 for engagement with the lower end of the latch 49.

The link 55 is then moved rearward (to the left as viewed in FIG. 4) and reaches the position where the shoulder 56 engages the stop 57 of the bracket 58 at 35 milliseconds. However, the link 55 continues rearward beyond this position to a rest position of the latch 49, this is reached at 40 milliseconds. The full rearward movement of the link 55 occurs at 47 milliseconds when the bell crank lever 62 is at the high dwell on the cam 10 or 11 of the throwout ring 17 to overthrow the latch 49 beyond its engaging position. Thereafter, the link 55 returns to the trip position at 71 milliseconds when the latch 49 returns to its latching position until a new cycle begins.

The shaft 1 completes the full rotation of 180° at 80 milliseconds when the stops 13 and 14 engage the forward walls of the grooves 15 and 16. Because the plastic member 50 absorbs a portion of the unlatching shock loading when the latching surface 47 or 48 engages the latch 49, there is a slight overthrow of the shaft 1 occurring from 80 to 88 milliseconds as illustrated in FIG. 7b.

The keeper 69 and the detent wheel 70 lock the shaft 1 when it returns from the overthrow position.

An advantage of this invention is that wear on the drive pawl is reduced. Another advantage of this invention is that overrunning of the clutch is eliminated. A further advantage of this invention is that it insures that each cycle of shaft rotation is 180°. A still further advantage of this invention is that the life expectancy of the clutch is increased by reducing high shock loading.

While the invention has been particularly shown and described with reference to a preferred embodiment thereof, it will be understood by those skilled in the art that various changes in form and details may be made therein without departing from the spirit and scope of the invention.

What is claimed is:
1. A power transmitting mechanism comprising:
a driving member having teeth on its periphery;
a driven member;
said driven member having a pair of pawls mounted thereon;
resilient means connecting said pawls to each other to urge said pawls into contact with said teeth of said driving member;
and means to overcome said resilient means to remove at least one of said pawls from contact with said teeth of said driving member to disconnect said driven member from said driving member.

2. A power transmitting mechanism comprising:
a driving member having teeth on its periphery;
a driven member;
said driven member having a pair of pawls pivotally mounted thereon;
means connecting said pawls to each other to urge both of said pawls into contact with said teeth of said driving member;
and means to remove at least one of said pawls from contact with said teeth of said driving member to disconnect said driven member from said driving member.

3. A clutch comprising:
a driving member;
a driven member;
said driven member having a pair of pawls mounted thereon;
resilient means connecting said pawls to each other to urge said pawls into contact with said driving member;
one of said pawls functioning to allow the driving member to drive the driven member and the other of said pawls functioning to prevent the driven member from overrunning the driving member;
and means to overcome said resilient means to remove said pawls from contact with said driving member to disconnect said driven member from said driving member.

4. A clutch comprising:
a driving member;
a driven member;
said driven member having a pair of pawls pivotally mounted thereon;
means connecting said pawls to each other to urge both of said pawls into contact with said driving member;
one of said pawls functioning to allow the driving member to drive the driven member and the other of said pawls functioning to prevent the driven member from overrunning the driving member;
and means to remove both of said pawls simultaneously from contact with said driving member to disconnect said driven member from said driving member.

5. A clutch comprising:
a driving member having a plurality of spaced teeth on its periphery;
a driven member;

said driven member having pawl means mounted thereon for engagement with said teeth of said driving member to connect said driving member and said driven member;

said pawl means including two pawls in contiguous relationship;

one of said pawls being movable relative to the other of said pawls;

and resilient means urging the end of said one pawl beyond the end of said other pawl whereby said one pawl must engage one of said teeth of said driving member before said other pawl can engage said one of said teeth of said driving member to connect said driving member to said driven member.

6. A clutch comprising:

a driving member having a plurality of spaced teeth on its periphery;

a driven member;

said driven member having pawl means mounted thereon for engagement with said teeth of said driving member to connect said driving member and said driven member;

said pawl means including two pawls in contiguous relationship;

one of said pawls being movable relative to the other of said pawls;

resilient means urging the end of said one pawl beyond the end of said other pawl;

and said one pawl having a cam surface on its end for cooperation with said teeth to move said pawl means into engagement with the next tooth when said one pawl does not engage a sufficient area of a tooth to provide positive engagement between said other pawl and said tooth.

7. A clutch comprising:

a driving member having teeth on its periphery;

a shaft;

a member pivotally mounted on said shaft;

means connecting said pivotally mounted member to said shaft;

said pivotally mounted member having pawl means mounted thereon for engagement with said teeth of said driving member to allow said driving member to drive said shaft;

said pawl means including two pawls in contiguous relationship;

one of said pawls being movable relative to the other of said pawls;

and means urging the end of said one pawl beyond the end of said other pawl whereby said one pawl must engage one of said teeth on said driving member before said other pawl can engage said one of said teeth of said driving member to allow said driving member to drive said shaft.

8. A clutch comprising:

a driving member having teeth on its periphery;

a shaft;

a member pivotally mounted on said shaft;

means connecting said pivotally mounted member to said shaft;

said pivotally mounted member having pawl means mounted thereon for engagement with said teeth of said driving member to allow said driving member to drive said shaft;

said pawl means including two pawls in contiguous relationship;

one of said pawls being movable relative to the other of said pawls;

means urging the end of said one pawl beyond the end of said other pawl;

and said one pawl having a cam surface on its end for cooperation with said teeth to move said pawl means into engagement with the next tooth when said one pawl does not engage a sufficient area of a tooth to provide positive engagement between said other pawl and said tooth.

9. A clutch comprising:

a driving member;

a shaft;

means connecting said driving member to said shaft whereby said driving member drives said shaft;

control means for regulating the rotation of said shaft, said control means adapted to be rotated during rotation of said shaft;

means to stop rotation of said control means to disconnect said connecting means after said shaft has been rotated 180° by said driving member;

and means to release said stop means.

10. A clutch comprising:

a driving member;

a shaft;

a member pivotally mounted on said shaft;

means connecting said pivotally mounted member to said shaft;

means connecting said pivotally mounted member and said driving member to allow said driving member to drive said shaft;

control means for regulating the rotation of said shaft, said control means adapted to be rotated during rotation of said shaft;

means to stop rotation of said control means to disconnect said pivotally mounted member from said driving member after said shaft has been rotated 180° by said driving member;

and means to release said stop means.

11. A clutch comprising:

a driving member having teeth on its periphery;

a shaft;

a pawl carrier rotatably mounted on said shaft;

means connecting said pawl carrier to said shaft;

said pawl carrier having two contiguous pawls pivotally mounted thereon and a pawl spaced from said two contiguous pawls and pivotally mounted thereon;

means connecting one of said two contiguous pawls and said spaced pawl to urge said two contiguous pawls and said spaced pawl into engagement with the teeth of said driving member;

the other of said two contiguous pawls being movable relative to said one of said two contiguous pawls;

means urging the end of said other of said two contiguous pawls beyond the end of said one of said two contiguous pawls whereby said other of said two contiguous pawls engages one of said teeth of said driving member prior to engagement by said one of said two contiguous pawls and said spaced pawl to prevent engagement of said one of said two contiguous pawls and said spaced pawl with said teeth of said driving member unless there is sufficient contact between said one of said teeth and said other of said two contiguous pawls to prevent slippage of said one of said two contiguous pawls;

and means to move said pawls into and away from engagement with said teeth of said driving member.

12. A clutch comprising:

a driving member having teeth on its periphery;

a shaft;

a pawl carrier rotatably mounted on said shaft;

means connecting said pawl carrier to said shaft;

said pawl carrier having two contiguous pawls pivotally mounted thereon and a pawl spaced from said two contiguous pawls and pivotally mounted thereon;

resilient means connecting one of said two contiguous pawls and said spaced pawl to urge said two contiguous pawls and said spaced pawl into engagement with the teeth of said driving member;

the other of said two contiguous pawls being movable relative to said one of said two contiguous pawls;

means urging the end of said other of said two contiguous pawls beyond the end of said one of said two contiguous pawls whereby said other of said two contiguous pawls engages one of said teeth of said driving member prior to engagement by said one of said two contiguous pawls and said spaced pawl to prevent engagement of said one of said two contiguous pawls and said spaced pawl with said teeth of said driving member unless there is sufficient contact between said one of said teeth and said other of said two contiguous pawls to prevent slippage of said one of said two contiguous pawls;

and means to move said pawls into and away from engagement with said teeth of said driving member.

13. A clutch comprising:

a driving member having teeth on its periphery;

a shaft;

a pawl carrier rotatably mounted on said shaft;

means connecting said pawl carrier to said shaft;

said pawl carrier having two contiguous pawls pivotally mounted thereon and a pawl spaced from said two contiguous pawls and pivotally mounted thereon;

means connecting one of said two contiguous pawls and said spaced pawl to urge said two contiguous pawls and said spaced pawl into engagement with the teeth of said driving member;

the other of said two contiguous pawls being movable relative to said one of said two contiguous pawls;

means urging the end of said other of said two contiguous pawls beyond the end of said one of said two contiguous pawls;

said other of said two contiguous pawls having a cam surface on its end for cooperation with said teeth of said driving member to prevent said one of said two contiguous pawls and said spaced pawl from engaging said teeth until there is sufficient contact to prevent slippage of said one of said two contiguous pawls;

and means to move said pawls into and away from engagement with said teeth of said driving member.

14. A clutch comprising:

a driving member having teeth on its periphery;

a shaft;

a pawl carrier rotatably mounted on said shaft;

means connecting said pawl carrier to said shaft;

said pawl carrier having two contiguous pawls pivotally mounted thereon and a pawl spaced from said two contiguous pawls and pivotally mounted thereon;

resilient means connecting one of said two contiguous pawls and said spaced pawl to urge said two contiguous pawls and said spaced pawl into engagement with the teeth of said driving member;

the other of said two contiguous pawls being movable relative to said one of said two contiguous pawls;

means urging the end of said other of said two contiguous pawls beyond the end of said one of said two contiguous pawls;

said other of said two contiguous pawls having a cam surface on its end for cooperation with said teeth of said driving member to prevent said one of said two contiguous pawls and said spaced pawl from engaging said teeth until there is sufficient contact to prevent slippage of said one of said two contiguous pawls;

and means to move said pawls into and away from engagement with said teeth of said driving member.

15. A clutch comprising:

a driving member having teeth on its periphery;

a shaft;

a pawl carrier rotatably mounted on said shaft;

said pawl carrier having a pair of spaced pawls pivotally mounted thereon;

means connecting said pawls to urge them into engagement with the teeth of said driving member;

means connecting said pawl carrier to said shaft;

a throwout ring mounted on said pawl carrier;

means on said pawls and said throwout ring cooperating to rotate said throwout ring;

means engaging said throwout ring to stop rotation of said throwout ring whereby said cooperating means remove said pawls from engagement with said teeth of said driving member;

and means to release said throwout ring engaging means to allow said pawl connecting means to urge said pawls into engagement with the teeth of said driving member.

16. A clutch comprising:

a driving member having teeth on its periphery;

a shaft;

a pawl carrier rotatably mounted on said shaft;

said pawl carrier having a pair of spaced pawls pivotally mounted thereon;

means connecting said pawls to urge them into engagement with the teeth of said driving member;

means connecting said pawl carrier to said shaft;

a throwout ring mounted on said pawl carrier;

each of said pawls having a pin extending therefrom;

said throwout ring having grooves therein for said pins on said pawls whereby said throwout ring is rotated;

said grooves having camming surfaces;

means engaging said throwout ring to stop rotation of said throwout ring whereby said pins engage said camming surfaces of said grooves to remove said pawls from engagement with said teeth of said driving member;

and means to release said throwout ring engaging means to allow said pawl connecting means to urge said pawls into engagement with the teeth of said driving member.

17. A clutch comprising:

a driving member having teeth on its periphery;

a shaft;

a pawl carrier rotatably mounted on said shaft;

means connecting said pawl carrier to said shaft;

said pawl carrier having two contiguous pawls pivotally mounted thereon and a pawl spaced from said two contiguous pawls and pivotally mounted thereon;

means connecting one of said two contiguous pawls and said spaced pawl to urge said two contiguous pawls and said spaced pawl into engagement with the teeth of said driving member;

the other of said two contiguous pawls being movable relative to said one of said two contiguous pawls;

means urging the end of said other of said two contiguous pawls beyond the end of said one of said two contiguous pawls whereby said other of said two contiguous pawls engages one of said teeth of said driving member prior to engagement by said one of said two contiguous pawls and said spaced pawl to prevent engagement of said one of said two contiguous pawls and said spaced pawl with said teeth of said driving member unless there is sufficient contact between said one of said teeth and said other of said two contiguous pawls to prevent slippage of said one of said two contiguous pawls;

a throwout ring mounted on said pawl carrier;

means on said one of said two contiguous pawls, said spaced pawl, and said throwout ring cooperating to rotate said throwout ring;

means engaging said throwout ring to stop rotation of said throwout ring whereby said cooperating means remove said two contiguous pawls and said spaced pawl from engagement with said teeth of said driving member;

and means to release said throwout ring engaging means to allow said pawl connecting means to urge said pawls into engagement with the teeth of said driving member.

18. A clutch comprising:

a driving member having teeth on its periphery;

a shaft;

a pawl carrier rotatably mounted on said shaft;
means connecting said pawl carrier to said shaft;
said pawl carrier having two contiguous pawls pivotally mounted thereon and a pawl spaced from said two contiguous pawls and pivotally mounted thereon;
means connecting one of said two contiguous pawls and said spaced pawl to urge said two contiguous pawls and said spaced pawl into engagement with the teeth of said driving member;
the other of said two contiguous pawls being movable relative to said one of said two contiguous pawls;
means urging the end of said other of said two contiguous pawls beyond the end of said one of said two contiguous pawls;
said other of said two contiguous pawls having a cam surface on its end for cooperation with said teeth of said driving member to prevent said one of said two contiguous pawls and said spaced pawl from engaging said teeth until there is sufficient contact to prevent slippage of said one of said two contiguous pawls;
a throwout ring mounted on said pawl carrier;
means on said one of said two contiguous pawls, said spaced pawl, and said throwout ring cooperating to rotate said throwout ring;
means engaging said throwout ring to stop rotation of said throwout ring whereby said cooperating means remove said two contiguous pawls and said spaced pawl from engagement with said teeth of said driving member;
and means to release said throwout ring engaging means to allow said pawl connecting means to urge said pawls into engagement with the teeth of said driving member.

19. A clutch comprising:
a driving member having teeth on its periphery;
a shaft;
a pawl carrier rotatably mounted on said shaft;
means connecting said pawl carrier to said shaft;
said pawl carrier having two contiguous pawls pivotally mounted thereon and a pawl spaced from said two contiguous pawls and pivotally mounted thereon;
means connecting one of said two contiguous pawls and said spaced pawl to urge said two contiguous pawls and said spaced pawl into engagement with the teeth of said driving member;
the other of said two contiguous pawls being movable relative to said one of said two contiguous pawls;
means urging the end of said other of said two contiguous pawls beyond the end of said one of said two contiguous pawls whereby said other of said two contiguous pawls engages one of said teeth of said driving member prior to engagement by said one of said two contiguous pawls and said spaced pawl to prevent engagement of said one of said two contiguous pawls and said spaced pawl with said teeth of said driving member unless there is sufficient contact between said one of said teeth and said other of said two contiguous pawls to prevent slippage of said one of said two contiguous pawls;
said one of said two contiguous pawls and said spaced pawl having pins thereon;
a throwout ring mounted on said pawl carrier;
said throwout ring having grooves therein for said pins on said one of said two contiguous pawls and said spaced pawl whereby said throwout ring is rotated;
said grooves having camming surfaces;
means engaging said throwout ring to stop rotation of said throwout ring whereby said pins engage said camming surfaces of said grooves to remove said two contiguous pawls and said spaced pawl from engagement with said teeth of said driving member;
and means to release said throwout ring engaging means to allow said pawl connecting means to urge said pawls into engagement with the teeth of said driving member.

20. A clutch comprising:
a driving member having teeth on its periphery;
a shaft;
a pawl carrier rotatably mounted on said shaft;
means connecting said pawl carrier to said shaft;
said pawl carrier having two contiguous pawls pivotally mounted thereon and a pawl spaced from said two contiguous pawls and pivotally mounted thereon;
means connecting one of said two contiguous pawls and said spaced pawl to urge said two contiguous pawls and said spaced pawl into engagement with the teeth of said driving member;
the other of said two contiguous pawls being movable relative to said one of said two contiguous pawls;
means urging the end of said other of said two contiguous pawls beyond the end of said one of said two contiguous pawls;
said other of said two contiguous pawls having a cam surface on its end for cooperation with said teeth of said driving member to prevent said one of said two contiguous pawls and said spaced pawl from engaging said teeth until there is sufficient contact to permit said one of said two contiguous pawls to transmit power from said driving member to said shaft;
said one of said two contiguous pawls and said spaced pawl having pins thereon;
a throwout ring mounted on said pawl carrier;
said throwout ring having grooves therein for said pins on said one of said two contiguous pawls and said spaced pawl whereby said throwout ring is rotated;
said grooves having camming surfaces;
means engaging said throwout ring to stop rotation of said throwout ring whereby said pins engage said camming surfaces of said grooves to remove said two contiguous pawls and said spaced pawl from engagement with said teeth of said driving member;
and means to release said throwout ring engaging means to allow said pawl connecting means to urge said pawls into engagement with the teeth of said driving member.

References Cited by the Examiner

UNITED STATES PATENTS

| | | | |
|---|---|---|---|
| 628,249 | 7/99 | Kane | 192—46 |
| 633,417 | 9/99 | Beaumont | 192—46 |
| 2,985,271 | 5/61 | Wilson | 192—33 |

FOREIGN PATENTS

| | | |
|---|---|---|
| 666,687 | 2/52 | Great Britain. |

DON A. WAITE, *Primary Examiner.*

UNITED STATES PATENT OFFICE
CERTIFICATE OF CORRECTION

Patent No. 3,212,610            October 19, 1965

George A. Walker et al.

It is hereby certified that error appears in the above numbered patent requiring correction and that the said Letters Patent should read as corrected below.

Column 4, line 26, for "and" read -- or --; line 69, for "surfaces" read -- surface --; column 6, line 38, for "latchings" read -- latching --; line 54, for "arms" read -- arm --; line 59, for "surfaces" read -- surface --; column 7, line 26, for "abcissas" read -- abscissas --; line 53, for "milliseconds," read -- milliseconds;--; line 60, for "49" read -- 49; --.

Signed and sealed this 28th day of June 1966.

(SEAL)
Attest:

ERNEST W. SWIDER            EDWARD J. BRENNER
Attesting Officer            Commissioner of Patents